(12) United States Patent
Flakus et al.

(10) Patent No.: US 8,536,251 B2
(45) Date of Patent: *Sep. 17, 2013

(54) COPOLYMER CONTAINING ACID BUILDING BLOCKS AND VARIOUS TYPES OF POLYETHER BUILDING BLOCKS

(75) Inventors: Silke Flakus, Ebersberg (DE); Klaus Lorenz, Zangberg (DE); Helmut Mack, Traunstein (DE); Christian Scholz, Wald an der Alz (DE); Petra Wagner, Trostberg (DE); Barbara Wimmer, Tacherting (DE); Angelika Hartl, Emertsham (DE); Martin Winklbauer, Halsbach (DE); Manfred Bichler, Engelsberg (DE)

(73) Assignee: Construction Research & Technology GmbH, Trostberg (DE)

( * ) Notice: Subject to any disclaimer, the term of this patent is extended or adjusted under 35 U.S.C. 154(b) by 100 days.

This patent is subject to a terminal disclaimer.

(21) Appl. No.: 13/132,990

(22) PCT Filed: Nov. 25, 2009

(86) PCT No.: PCT/EP2009/065786
§ 371 (c)(1),
(2), (4) Date: Aug. 22, 2011

(87) PCT Pub. No.: WO2010/076093
PCT Pub. Date: Jul. 8, 2010

(65) Prior Publication Data
US 2011/0301275 A1    Dec. 8, 2011

(30) Foreign Application Priority Data
Dec. 8, 2008 (EP) ................................ 08170968

(51) Int. Cl.
| | |
|---|---|
| *C04B 24/26* | (2006.01) |
| *C08L 53/00* | (2006.01) |
| *C08L 39/04* | (2006.01) |
| *C08L 27/04* | (2006.01) |
| *C08L 29/00* | (2006.01) |
| *C08K 5/00* | (2006.01) |
| *C08F 16/12* | (2006.01) |
| *C08F 220/12* | (2006.01) |
| *C08F 12/30* | (2006.01) |
| *C08F 30/02* | (2006.01) |

(52) U.S. Cl.
USPC .............. 524/4; 524/501; 524/515; 525/203; 525/212; 525/231; 525/404; 526/333; 526/329.6; 526/287; 526/278

(58) Field of Classification Search
USPC ..................... 524/4, 501, 515; 525/203, 212, 525/231, 404; 526/333, 329.6, 287, 278
See application file for complete search history.

(56) References Cited

U.S. PATENT DOCUMENTS

| | | | |
|---|---|---|---|
| 7,691,921 B2 | 4/2010 | Asano et al. | |
| 2006/0183820 A1* | 8/2006 | Asano et al. | ...................... 524/5 |
| 2007/0161724 A1* | 7/2007 | Moraru et al. | ................. 524/59 |
| 2011/0136944 A1 | 6/2011 | Moraru et al. | |

FOREIGN PATENT DOCUMENTS

| | | |
|---|---|---|
| EP | 1 690 877 B1 | 7/2008 |
| WO | WO 2005/075529 A2 | 8/2005 |

OTHER PUBLICATIONS

PCT/EP2009/065786—International Search Report, Dec. 1, 2010.
PCT/EP2009/065786—International Written Opinion, Dec. 1, 2010.
PCT/EP2009/065786—International Preliminary Report on Patentability, Jun. 14, 2011.

* cited by examiner

*Primary Examiner* — Michael Bernshteyn
(74) *Attorney, Agent, or Firm* — Curatolo Sidoti Co., LPA; Joseph G. Curatolo; Salvatore A. Sidoti

(57) ABSTRACT

The invention relates to a copolymer comprising
  i) 3 to 40 mol % of an isoprenolpolyether derivative structural unit α
  ii) 3 to 40 mol % of a vinyloxypolyether derivative structural unit β and
  iii) 35 to 93 mol % of an acid structural unit γ,
the structural units of the copolymer which belong to the vinyloxypolyether derivative structural unit β having longer side chains than the structural units which belong to the isoprenolpolyether derivative structural unit α.

16 Claims, No Drawings

COPOLYMER CONTAINING ACID BUILDING BLOCKS AND VARIOUS TYPES OF POLYETHER BUILDING BLOCKS

CROSS REFERENCE TO RELATED APPLICATIONS

This application is a national stage application of International Application No. PCT/EP2009/065786, filed 25 Nov. 2009, which claims priority from European Patent Application Serial No. 08170968.5, filed 8 Dec. 2008, from which applications priority is claimed, and which are incorporated herein by reference.

The present invention relates to a copolymer, a dispersant, the preparation of the copolymer and of the dispersant and the use of the copolymer.

It is known that admixtures in the form of dispersants are often added to aqueous slurries of powdery inorganic or organic substances, such as clays, silicate powder, chalk, carbon black, crushed rock and hydraulic binders, for improving their workability, i.e. kneadability, spreadability, sprayability, pumpability or flowability. Such admixtures are capable of preventing the formation of solid agglomerates, of dispersing particles which are already present and particles newly formed by hydration and in this way of improving the workability. This effect is utilized in particular in a targeted manner in the preparation of construction material mixtures which contain hydraulic binders, such as cement, lime, gypsum, hemihydrate or anhydrite.

In order to convert these construction material mixtures based on said binders into a ready-to-use workable form, as a rule substantially more mixing water is required than would be necessary for the subsequent hydration or hardening process. The proportion of cavities formed in the concrete body due to the excess, subsequently evaporating water leads to significantly poorer mechanical strengths and durability.

In order to reduce this excess proportion of water at a specified processing consistency and/or to improve the workability at a specified water/binder ratio, admixtures which are generally referred to as water reduction agents or superplasticizers are used. In particular, copolymers which are prepared by free radical copolymerization of acid monomers and/or acid derivative monomers with polyether macromonomers are used in practice as such agents.

WO 2005/075529 describes copolymers which, in addition to acid monomer structural units, have vinyloxybutylenepoly(ethylene glycol) structural units as polyether macromonomer structural units. Such copolymers are widely used as high-performance superplasticizers since they have excellent performance characteristics.

Although the copolymers described are to be regarded as economical high-performance superplasticizers, there continues to be an aspiration to improve further the quality and the cost-efficiency of the copolymers.

The object of the present invention is therefore to provide an economical dispersant for hydraulic binders, which is suitable in particular as a superplasticizer for concrete.

The achievement of this object is a copolymer comprising
i) 3 to 40 mol % of an isoprenolpolyether derivative structural unit α
ii) 3 to 40 mol % of a vinyloxypolyether derivative structural unit β and
iii) 35 to 93 mol % of an acid structural unit γ,
the isoprenolpolyether derivative structural unit α being represented by the following general formula (Ia)

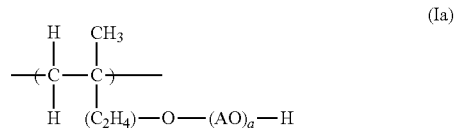

where
A are identical or different and are represented by an alkylene group according to $C_xH_{2x}$, where x=2, 3, 4 or 5, and
a are identical or different and are represented by an integer between 4 and 300,
the vinyloxypolyether derivative structural unit β being represented by the following general formula (Ib)

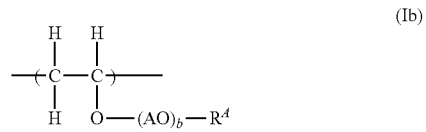

where $R^A$ are identical or different and are represented by a hydrogen atom, a linear or branched $C_1$-$C_{12}$ alkyl group, $C_5$-$C_8$ cycloalkyl group, phenyl group or $C_7$-$C_{12}$ arylalkyl group,
A are identical or different and are represented by an alkylene group according to $C_xH_{2x}$ where x=2, 3, 4 or 5, and
b are identical or different and are represented by an integer from 6 to 450, the arithmetic mean of the alkylene groups A of the structural units which belong to the vinyloxypolyether derivative structural unit β being higher by at least the factor 1.5 than the arithmetic mean of the alkylene groups A of the structural units which belong to the isoprenolpolyether derivative structural unit α.

The structural units of the copolymer which belong to the acid structural unit γ are produced by incorporating corresponding acid monomers in the form of polymerized units. In this context, acid monomer is to be understood as meaning monomers which are capable of free radical copolymerization, have at least one carbon double bond, contain at least one acid function and react as an acid in an aqueous medium. Furthermore, acid monomer is also to be understood as meaning monomers which are capable of free radical copolymerization, have at least one carbon double bond, form at least one acid function as a result of a hydrolysis reaction in an aqueous medium and react as an acid in an aqueous medium (example: maleic anhydride or base-hydrolyzable esters, such as ethyl acrylate).

In general, it may be said that the mode of action of relevant copolymers having polyether macromonomer structural units and acid structural units is determined by their structural parameters. The action spectrum of corresponding high-performance copolymers covers the entire range from extreme water reduction to extreme slump retention, structural parameters which ensure water reduction conflicting with good slump retention. Thus, in addition to the charge quantity per unit mass, the length of the side chains is also decisive, for example with regard to the water reduction capability. For the respective practical application, a "compromise" with regard to the choice of short and long side chains is frequently optimum, it having been recognized that mixtures of short and long side chains generally offer the best solution in this respect. The present invention realizes how such mixtures are provided economically and in high quality. The polyethermacromonomer structural units which are of the vinyloxypolyether type can be more easily incorporated in the form of polymerized units with long polyether side chains, owing to the high reactivity of the corresponding monomer (i.e. also more easily with a low residual monomer content) than comparatively the polyethermacromonomer structural units which are of the isoprenolpolyether type. Monomers of the isoprenolpolyether type, which have relatively short side chains, can, however, be incorporated in the form of polymerized units equally well (with low residual monomer content), these monomers of the isoprenolpolyether type being particularly economically available starting materials. In summary, it may be said that the copolymer according to the invention represents a high-quality and particularly economical dispersant for hydraulic binders.

As a rule, the arithmetic mean of the alkylene groups A of the structural units which belong to the vinyloxypolyether derivative structural unit β is higher by at least the factor 2 than the arithmetic mean of the alkylene groups A of the structural units which belong to the isoprenolpolyether derivative structural unit α.

In general, a are identical or different and are represented by an integer between 5 and 70, b being identical or different and being represented by an integer from 41 to 400.

Often, a are identical or different and are represented by an integer between 5 and 39.

Preferably, the copolymer according to the invention comprises i) 5 to 35 mol % of an isoprenolpolyether derivative structural unit α, ii) 5 to 35 mol % of a vinyloxypolyether derivative structural unit β and iii) 50 to 90 mol % of an acid structural unit γ.

As a rule, the vinyloxypolyether derivative structural unit β is produced by incorporating in the form of polymerized units alkoxylated hydroxybutylvinylether which preferably has an arithmetic mean of oxyalkylene groups of 41 to 400.

In a preferred embodiment, the acid structural unit γ is present according to one of the general formulae (IIa), (IIb), (IIc) and/or (IId)

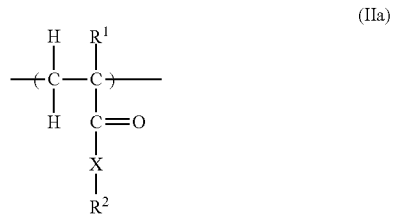
(IIa)

where $R^1$ are identical or different and are represented by H and/or a straight-chain or a branched $C_1$-$C_4$ alkyl group;

X are identical or different and are represented by NH—$(C_nH_{2n})$ where n=1, 2, 3 or 4 and/or O—$(C_nH_{2n})$ where n=1, 2, 3 or 4 and/or by a unit not present;

$R^2$ are identical or different and are represented by OH, $SO_3H$, $PO_3H_2$, O—$PO_3H_2$ and/or para-substituted $C_6H_4$—$SO_3H$, with the proviso that, if X is a unit not present, $R^2$ is represented by OH;

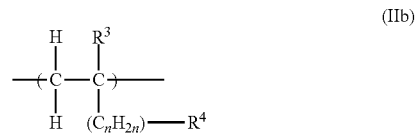
(IIb)

where $R^3$ are identical or different and are represented by H and/or a straight-chain or branched $C_1$-$C_4$ alkyl group;

n=0, 1, 2, 3 or 4;

$R^4$ are identical or different and are represented by $SO_3H$, $PO_3H_2$, O—$PO_3H_2$ and/or para-substituted $C_6H_4$—$SO_3H$;

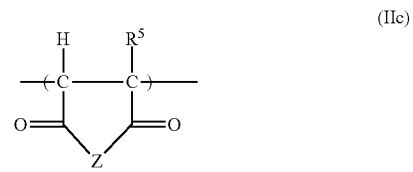
(IIc)

where $R^5$ are identical or different and are represented by H and/or a straight-chain or branched $C_1$-$C_4$ alkyl group;

Z are identical or different and are represented by O and/or NH;

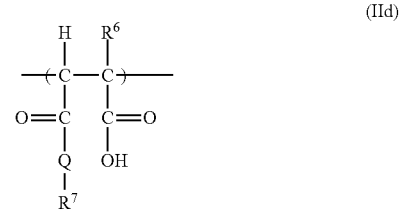
(IId)

where $R^6$ are identical or different and are represented by H and/or a straight-chain or branched $C_1$-$C_4$ alkyl group;

Q are identical or different and are represented by NH and/or O;

$R^7$ are identical or different and are represented by H, $(C_nH_{2n})$—$SO_3H$ where n=0, 1, 2, 3 or 4, $(C_nH_{2n})$—OH where n=0, 1, 2, 3 or 4; $(C_nH_{2n})$—$PO_3H_2$ where n=0, 1, 2, 3 or 4, $(C_nH_{2n})$—$OPO_3H_2$ where n=0, 1, 2, 3 or 4, $(C_6H_4)$—$SO_3H$, $(C_6H_4)$—$PO_3H_2$, $(C_6H_4)$—$OPO_3H_2$ and/or $(C_mH_{2m})_e$—O-(A'O)$_\alpha$—$R^9$ where m=0, 1, 2, 3 or 4, α=0, 1, 2, 3 or 4, A'=$C_xH_{2x'}$ where x'=2, 3, 4 or 5 and/or $CH_2C(C_6H_5)H$—, α=an integer from 1 to 350 with $R^9$ identical or different and represented by a straight-chain or a branched $C_1$-$C_4$ alkyl group.

Frequently, the acid structural unit γ is produced by incorporation of the acid monomers methacrylic acid, acrylic acid, maleic acid and/or maleic anhydride in the form of polymerized units.

Depending on the pH, the acid structural unit γ can also be present in deprotonated form as a salt, in which case typical counterions are $Na^+$, $K^+$ and $Ca^{2+}$.

In general, at least 45 mol %, preferably at least 80 mol %, of all structural units are present as isoprenolpolyether derivative structural unit α, vinyloxypolyether derivative structural unit β and acid structural unit γ in the copolymer according to the invention.

The invention also relates to a dispersant containing at least 30% by weight of water and at least 10% by weight of the copolymer described above. The dispersant is preferably present in the form of an aqueous solution.

In addition, the invention relates to a process for the preparation of the copolymer according to the invention and of the dispersant according to the invention, in which isoprenolpolyether derivative monomer, vinyloxypolyether derivative monomer and acid monomer are reacted by free radical polymerization with the use of a peroxide-containing redox initiator system in aqueous solution and the temperature of the aqueous solution during the polymerization is 10 to 45° C. and the pH being 3.5 to 6.5.

Finally, the present invention relates to the use of the copolymer as a dispersant for hydraulic binders and/or for latent hydraulic binders. The copolymer according to the invention can also be used, for example (particularly in dewatered form), as an additive for cement production (grinding aid and "water reducer" for fine Portland cements or composite cements).

Below, the invention is to be explained in more detail with reference to working examples.

SYNTHESIS EXAMPLE 1

A glass reactor equipped with several feeding devices, stirrer and pH electrode was charged with 285 g of water, 210 g of vinyloxybutylpolyethylene glycol-3000 (prepared by ethoxylation of hydroxybutyl vinyl ether with 66 mol EO) and 23.3 g of isoprenylpolyethylene glycol-500 (prepared by ethoxylation of 3-methyl-3-buten-1-ol with 10 mol EO) (solution A) and was thermostated at 13° C. 35% of a second prepared, partly neutralized solution (solution B) consisting of 50 g of water and 25.4 g of acrylic acid (99%) was added to solution A over a period of 15 min in the glass reactor. Furthermore, 1.9 g of 3-mercaptopropionic acid was added to the reactor. A third solution (solution C) consisting of 5 g of a mixture of sodium sulphite, the disodium salt of 2-hydroxy-2-sulphinatoacetic acid and the disodium salt of 2-hydroxy-2-sulphonatoacetic acid (Brüggolit FF6 from Brüggemann GmbH) and 40 g of water was prepared. Thereafter, 50 mg of iron(II) sulphate haptahydrate, dissolved in a few drops of water, and 2.5 g of 50% strength hydrogen peroxide solution were added to solution A at a temperature of 13° C. At the same time, the still remaining solution B was dosed over 45 minutes and solution C over 60 minutes into the solution A. Finally, neutralization was effected with 20% strength sodium hydroxide solution. The aqueous solution of a copolymer having an average molecular weight of Mw=24 300 g/mol (determined by GPC) and a solids content of 39% was obtained.

SYNTHESIS EXAMPLE 2

A glass reactor equipped with several feeding devices, stirrer and pH electrode was charged with 382 g of water, 263 g of vinyloxybutylpolyethylene glycol-3000 (prepared by ethoxylation of hydroxybutyl vinyl ether with 66 mol EO) and 96 g of isoprenylpolyethylene glycol-1100 (prepared by ethoxylation of 3-methyl-3-buten-1-ol with 22 mol EO) (solution A) and was thermostated at 13° C. 35% of a second prepared, partly neutralized solution (solution B) consisting of 68 g of water and 63.6 g of acrylic acid (99%) was added to solution A over a period of 15 min in the glass reactor. Furthermore, 3.6 g of 3-mercaptopropionic acid were added to the reactor. A third solution (solution C) consisting of 10 g of a mixture of sodium sulphite, the disodium salt of 2-hydroxy-2-sulphinatoacetic acid and the disodium salt of 2-hydroxy-2-sulphonatoacetic acid (Brüggolit FF6 from Brüggemann GmbH) and 60 g of water was prepared. Thereafter, 50 mg of iron(II) sulphate heptahydrate, dissolved in a few drops of water, and 5 g of 50% strength hydrogen peroxide solution were added to solution A at a temperature of 13° C. At the same time, the still remaining solution B was dosed over 45 minutes and solution C over 60 minutes into the solution A. Finally, neutralization was effected with 20% strength sodium hydroxide solution. The aqueous solution of a copolymer having an average molecular weight of Mw=22 400 g/mol (determined by GPC) and a solids content of 41% was obtained.

COMPARATIVE EXAMPLE

(Comp.)—Corresponding to the Preparation Examples

Commercial concrete MVA 1855 (BASF Construction Polymers GmbH) based on a copolymer of vinyloxybutylenepoly(ethylene glycol) of different chain length, an ethylenically unsaturated carboxylic acid and a base-hydrolyzable vinyl ester—the polymer according to the comparative example has a related polymer architecture compared with copolymer type 1.

For evaluating the copolymer solutions, mortar tests were carried out. The experimental procedures are described in the use example. In the tests, it was intended to check whether the copolymer solutions according to the invention show a comparably good or better performance, i.e. the same or better fluidification and a comparable slump retention, under the same test conditions (w/c value, temperature, aggregates, etc.) at the same or a lower dose.

Use Example/Carrying Out the Mortar Tests:

876.65 g of Portland cement (CEM I 42.5 R, Karlstadt) was stirred with 1350 g of standard sand, 567.87 g of quartz sand and 350.66 g of water which contained the products according to the invention or the comparative product in dissolved form. Immediately after the preparation of the mortar mix, the determination of the slump and the change thereof as a function of time over a period of 30 minutes was effected.

The results of the test are shown below in the form of a table.

| Additive | Solid [% by weight] | Dose [% by weight] | Slump in cm after | | |
|---|---|---|---|---|---|
| | | | 0 min. | 15 min. | 30 min. |
| Ex. 1 | 33.2 | 0.15 | 24.3 | 23.2 | 23 |
| Ex. 2 | 33.2 | 0.15 | 25 | 24 | 23 |
| Comp. | 33.2 | 0.24 | 24.4 | 24 | 24 | w/c = 0.42; cement: Karlstadt CEM I 425.5 R

Overall Conclusion from the Results of the Comparative Experiments:

The above experiments show that the quality and the cost-efficiency of the super plasticizers based on the copolymers from synthesis examples 1 and 2 relating to the invention are outstanding in comparison with the high-performance polymer (Comp.) which has already proved its worth in practice. Compared with the commercially available product, the copolymers according to the invention have substantial economic advantages in combination with comparable good performance. The copolymers according to the invention achieve the same slump with a 38% lower dosing rate and nevertheless show good slump retention. This shows that the combination of a long polyethermacromonomer structural unit as the vinyloxypolyether type with a shorter polyethermacromonomer structural unit of the particularly economical isoprenolpolyether type enables the synthesis of high-quality polymers with which both outstanding water reduction and good slump retention can be achieved. The use of an economical structural unit on the one hand and the lower metering rate on the other hand thus results in high-quality polymers which are particularly economical in practice and, owing to their structure, have a universal field of use.

The invention claimed is:

1. A copolymer comprising:
   i) 3 to 40 mol % of an isoprenolpolyether derivative structural unit α
   ii) 3 to 40 mol % of a vinyloxypolyether derivative structural unit β and
   iii) 35 to 93 mol % of an acid structural unit γ,
the isoprenolpolyether derivative structural unit α being represented by the following general formula (Ia)

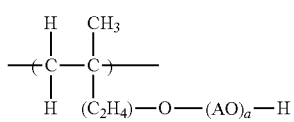

(Ia)

where
A are identical or different and are represented by an alkylene group according to $C_xH_{2x}$ where x=2, 3, 4 or 5, and
a are identical or different and are represented by an integer between 4 and 300,
the vinyloxypolyether derivative structural unit β being represented by the following general formula (Ib)

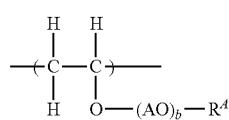

(Ib)

where $R^4$ are identical or different and are represented by a hydrogen atom, a linear $C_1$-$C_{12}$ alkyl group or branched $C_3$-$C_{12}$ alkyl group, $C_5$-$C_8$ cycloalkyl group, phenyl group or $C_7$-$C_{12}$ arylalkyl group,
A are identical or different and are represented by an alkylene group according to $C_xH_{2x}$ where x=2, 3, 4 or 5, and
b are identical or different and are represented by an integer from 6 to 450,
the arithmetic mean of the alkylene groups A of the structural units which belong to the vinyloxypolyether derivative structural unit β being higher by at least the factor 1.5 than the arithmetic mean of the alkylene groups A of the structural units which belong to the isoprenolpolyether derivative structural unit α.

2. The copolymer according to claim 1, wherein the arithmetic mean of the alkylene groups A of the structural units which belong to the vinyloxypolyether derivative structural unit β is higher by at least the factor 2 than the arithmetic mean of the alkylene groups A of the structural units which belong to the isoprenolpolyether derivative structural unit α.

3. The copolymer according to claim 1 wherein a is identical or different and is represented by an integer between 5 and 70, and b is identical or different and is represented by an integer from 41 to 400.

4. The copolymer according to claim 1, wherein a is identical or different and is represented by an integer between 5 and 39.

5. The copolymer according to claim 1, comprising
   i) 5 to 35 mol % of an isoprenolpolyether derivative structural unit α,
   ii) 5 to 35 mol % of a vinyloxypolyether derivative structural unit β and
   iii) 50 to 90 mol % of an acid structural unit γ.

6. The copolymer according to claim 1, wherein the vinyloxypolyether derivative structural unit β is produced by incorporating, in the form of polymerized units, alkoxylated hydroxybutyl vinyl ether which has an arithmetic mean of oxyalkylene groups of 41 to 400.

7. The copolymer according to claim 1, wherein the acid structural unit γ is represented by one of the general formulae (IIa), (IIb), (IIc) and/or (IId)

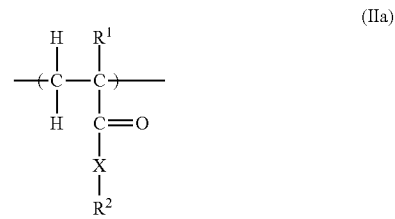

(IIa)

where
$R^1$ are identical or different and are represented by H and/or a straight-chain $C_1$-$C_4$ alkyl group or a branched $C_3$-$C_4$ alkyl group;
X are identical or different and are represented by NH—$(C_nH_{2n})$ where n=1, 2, 3 or 4 and/or O—$(C_nH_{2n})$ where n=1, 2, 3 or 4 and/or is not present;
$R^2$ are identical or different and are represented by OH, $SO_3H$, $PO_3H_2$, O—$PO_3H_2$ and/or para-substituted $C_6H_4$—$SO_3H$, with the proviso that, if X is not present, $R^2$ is represented by OH;

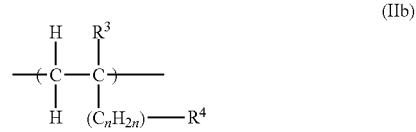

(IIb)

where
$R^3$ are identical or different and are represented by H and/or a straight-chain $C_1$-$C_4$ alkyl group or a branched $C_3$-$C_4$ alkyl group;
n=0, 1, 2, 3 or 4;
$R^4$ are identical or different and are represented by $SO_3H$, $PO_3H_2$, O—$PO_3H_2$ and/or para-substituted $C_6H_4$—$SO_3H$;

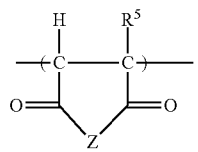

(IIc)

where
R⁵ are identical or different and are represented by H and/or a straight-chain $C_1$-$C_4$ alkyl group or a branched $C_3$-$C_4$ alkyl group;
Z are identical or different and are represented by O and/or NH;

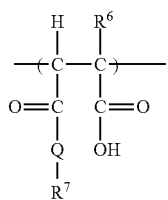

(IId)

where
R⁶ are identical or different and are represented by H and/or a straight-chain $C_1$-$C_4$ alkyl group or a branched $C_3$-$C_4$ alkyl group;
Q are identical or different and are represented by NH and/or O;
R⁷ are identical or different and are represented by H, $(C_nH_{2n})$—$SO_3H$ where n=1, 2, 3 or 4, $(C_nH_{2n})$—OH where n=1, 2, 3 or 4; $(C_nH_{2n})$—$PO_3H_2$ where n=0, 1, 2, 3 or 4, $(C_nH_{2n})$—$OPO_3H_2$ where n=1, 2, 3 or 4, $(C_6H_4)$—SO3H, $(C_6H_4)$—$PO_3H_2$, $(C_6H_4)$—$OPO_3H_2$ and/or $(C_mH_{2m})_e$—O-(A'O)$_\alpha$—R⁹ where m=1, 2, 3 or 4, e=1, 2, 3 or 4, A'=$C_xH_{2x}$ where x'=2, 3, 4 or 5 and/or A'=$CH_2C(C_6H_5)H$, α is an integer from 1 to 350; R⁹ are identical or different and represented by a straight-chain $C_1$-$C_4$ alkyl group or a branched $C_3$-$C_4$ alkyl group.

8. The copolymer according to claim 1, wherein the acid structural unit γ is produced by incorporating acid monomer in the form of polymerized units, wherein the acid monomer is methacrylic acid, acrylic acid, maleic acid, maleic anhydride or mixtures thereof.

9. The copolymer according to claim 1, wherein at least 45 mol % of all structural units are isoprenolpolyether derivative structural unit α, vinyloxypolyether derivative structural unit β and acid structural unit γ.

10. A dispersant containing water in an amount of at least 30% by weight of the dispersant and containing the copolymer according to claim 1 in an amount of at least 10% by weight of the dispersant.

11. The dispersant according to claim 10 comprising an aqueous solution.

12. A process for the preparation of a copolymer according to claim 1, comprising reacting isoprenolpolyether derivative monomer, vinyloxypolyether derivative monomer and acid monomer by free radical polymerization with a peroxide-containing redox initiator system in aqueous solution, wherein the temperature of the aqueous solution during the polymerization is 10 to 45° C. and the pH is 3.5 to 6.5.

13. A process for using the copolymer according to claim 1 as a dispersant for hydraulic binders and/or for latent hydraulic binders, comprising adding the copolymer to a mixture comprising water and at least one of the hydraulic binders or latent hydraulic binders, and mixing.

14. A process for the preparation of a dispersant according to claim 10 comprising reacting isoprenolpolyether derivative monomer, vinyloxypolyether derivative monomer and acid monomer by free radical polymerization with a peroxide-containing redox initiator system in aqueous solution, wherein the temperature of the aqueous solution during the polymerization is 10 to 45° C. and the pH is 3.5 to 6.5.

15. The process according to claim 1, comprising producing the vinyloxypolyether derivative structural unit β by incorporating, in the form of polymerized units, alkoxylated hydroxybutyl vinyl ether which has an arithmetic mean of oxyalkylene groups of 41 to 400.

16. The process according to claim 1 wherein at least 80 mol % of all structural units are present as isoprenolpolyether derivative structural unit β, vinyloxypolyether derivative structural unit β and acid structural unit γ.

* * * * *